United States Patent

Sears et al.

[11] Patent Number: 5,321,986
[45] Date of Patent: Jun. 21, 1994

[54] POLAR LOOP IMPLEMENTATION FOR A TWO DEGREE OF FREEDOM GYRO

[75] Inventors: Jerome Sears, Wyckoff; Walter Parfomak, Wallington; Walter Kluss, Kearny, all of N.J.

[73] Assignee: AlliedSignal Inc., Morris Township, Morris County, N.J.

[21] Appl. No.: 933,277

[22] Filed: Aug. 21, 1992

[51] Int. Cl.$^5$ .................. G01C 19/30; G01C 19/28
[52] U.S. Cl. .................. 74/5.46; 74/5.6 E; 74/5.7
[58] Field of Search .................. 74/5.46, 5.7, 5.6 E

[56] References Cited

U.S. PATENT DOCUMENTS

| | | | |
|---|---|---|---|
| 2,798,995 | 7/1957 | McLean | 74/5.6 E X |
| 2,963,912 | 12/1960 | Kawarada | 74/5.7 |
| 3,252,340 | 5/1966 | Watt | 74/5.46 |
| 3,260,122 | 7/1966 | Rocks | 74/5.7 X |
| 4,277,039 | 7/1981 | Blanning et al. | 244/3.16 |
| 4,314,188 | 2/1982 | Voigt | 318/721 |
| 4,377,950 | 3/1983 | Chombard | 74/5.44 |
| 4,397,185 | 8/1983 | Craig et al. | 73/504 |
| 4,452,092 | 6/1984 | Dankwort | 74/5.46 |
| 4,487,083 | 12/1984 | Quermann | 74/5.46 |
| 4,818,922 | 4/1989 | Sears et al. | 318/313 |
| 4,862,050 | 8/1989 | Parfomak et al. | 318/689 |
| 5,070,289 | 12/1991 | Pona | 318/640 |

FOREIGN PATENT DOCUMENTS

2224119  4/1990  United Kingdom .............. 74/5.6 E

Primary Examiner—Rodney H. Bonck
Attorney, Agent, or Firm—Howard G. Massung

[57] ABSTRACT

A two degree of freedom gyroscope having a drive motor (20), with a permanent magnet rotor (22), which comprises a sensing coil (32) looped around the permanent magnet rotor (22) and disposed in a plane orthogonal to a null spin axis, a torquer coil looped around the permanent magnet rotor (22) and disposed in a plane orthogonal to the null spin axis, and torque drive elements (62, 64, 65) responsive to the signal induced in the sensing coil (32) when the actual rotor (22) spin axis is displaced from the null spin axis (28) for providing current to said torquer coil (34) to urge the axes to coincide. Demodulators (70, 72) can be provided for providing output information in an X-Y coordinate format which is indicative of the actual input angular rates about corresponding axes.

7 Claims, 7 Drawing Sheets

POLAR LOOP IMPLEMENTATION FOR A TWO DEGREE OF FREEDOM GYRO

BACKGROUND OF THE INVENTION

1. Field of the Invention

The present invention relates to gyroscopes and more particularly to a permanent magnet, two degree of freedom gyroscope which utilizes sensors and a z-axis torquer for closing the rotor positioning servo loop around the two degree of freedom gyroscope.

2. Description of the Prior Art

It is known in the art to use permanent magnet motors for driving inertial gyroscope sensing instruments. U.S. Pat. No. 4,818,922 describes a prior art permanent magnet motor drive for a gyro rotor. Permanent magnet motors are utilized in inertial gyroscope sensing instruments where optimum efficiency, rate stability and low run up time are required. The drive motors include a two phase stator, permanent magnet rotor and suitable drive circuitry to start, run up and maintain synchronous speed. The rotor is supported by a hydrodynamic bearing wherein the spinning rotor supplies the pressurized fluid for the bearing.

In conventional two degree of freedom gyros, two separate control paths are utilized using an angle sensor on each axis and a torque transducer acting about each axis. The conventional cartesian or rectangular coordinate means of closing the X-Y loops in a two degree of freedom instrument are described in U.S. Pat. No. 4,862,050. In conventional two degree of freedom gyro loop implementations two separate control paths are utilized using an angle sensor on each axis and a torque transducer acting about each axis. The separate angular sensors are used for sensing tilt about stationary X and Y axes and two separate torquers are used for implementing two stationary servo loops to urge the actual rotor spin axis to the nominal or null spin axis. The output signals from the two sensors serve as inputs to the torquer servo control electronics. The servo control electronics extracts and processes the angular displacement information and provides the drive currents to the two torquers to obtain two axes control.

The present invention eliminates the use of two torquers and two sensors and utilizes a single sensor and a single torquer to obtain two axis control of the gyro rotor.

SUMMARY OF THE INVENTION

A method and apparatus for operating a two degree of freedom permanent magnet motor gyroscope utilizing a single sensor and a single torquer each disposed in a plane orthogonal to the gyro spin axis to obtain two axis control. The single sensor coil and the single torquer coil each utilize at least one loop lying in the plane orthogonal to the gyro's reference or null spin axis and disposed in close proximity to the rotating permanent magnet rotor. When the actual rotor spin axis is displaced from the reference or null spin axis, a signal is induced in the single angular sensor providing polar gyro tilt information where the magnitude of the signal is a function of the tilt magnitude and the phase of the signal is a function of an arbitrary tilt axis position with respect to the sensor. The sensor tilt information is propagated along a single electronic channel. The sensor tilt information is phase and magnitude conditioned along the way prior to activating a single torquer driver electronic stage. A single magnetic torquer is utilized to rebalance, on an instantaneous basis, the sensed tilt. Since the tilt is being sensed about any axis, which lies in the plane orthogonal to the null spin axis, as the wheel rotates at high rpm the correct single torque drive current is applied to the single torquer at the correct phase and magnitude to rebalance the sensed tilt.

In the present invention a single polar angular sensor replaces two separate angular sensors sensing tilt about the X and Y axes and a single polar torquer replaces two separate torquers acting about the X and Y axes. The single polar servo loop implementation rotating about the gyro spin axis at the gyro rotor angular rate replaces the two separate stationary cartesian servo loops.

BRIEF DESCRIPTION OF THE DRAWINGS

For a better understanding of the invention, reference may be had to the preferred embodiments exemplary thereof shown in the accompanying drawings in which.

DETAILED DESCRIPTION OF THE PREFERRED EMBODIMENTS

Figure 11:
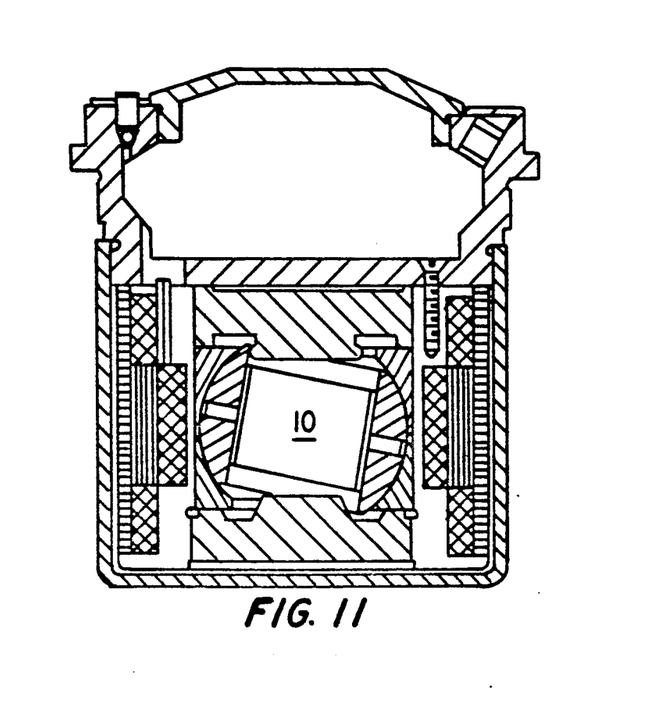

Referring to FIG. 11 there is shown a two degree of freedom angular rate sensor or gyroscope 10 used primarily for tactical applications. Gyroscope 10 includes a spherical hydrodynamic fluid bearing rotor, a permanent magnet motor/torquer and an optical pickoff to provide two axes of rate information in a small package. U.S. Pat. No. 5,070,289 describes in detail the construction of gyroscope 10. Gyroscope 10 can be modified by a sensor and torquer according to the invention disclosed herein.

Figure 1:
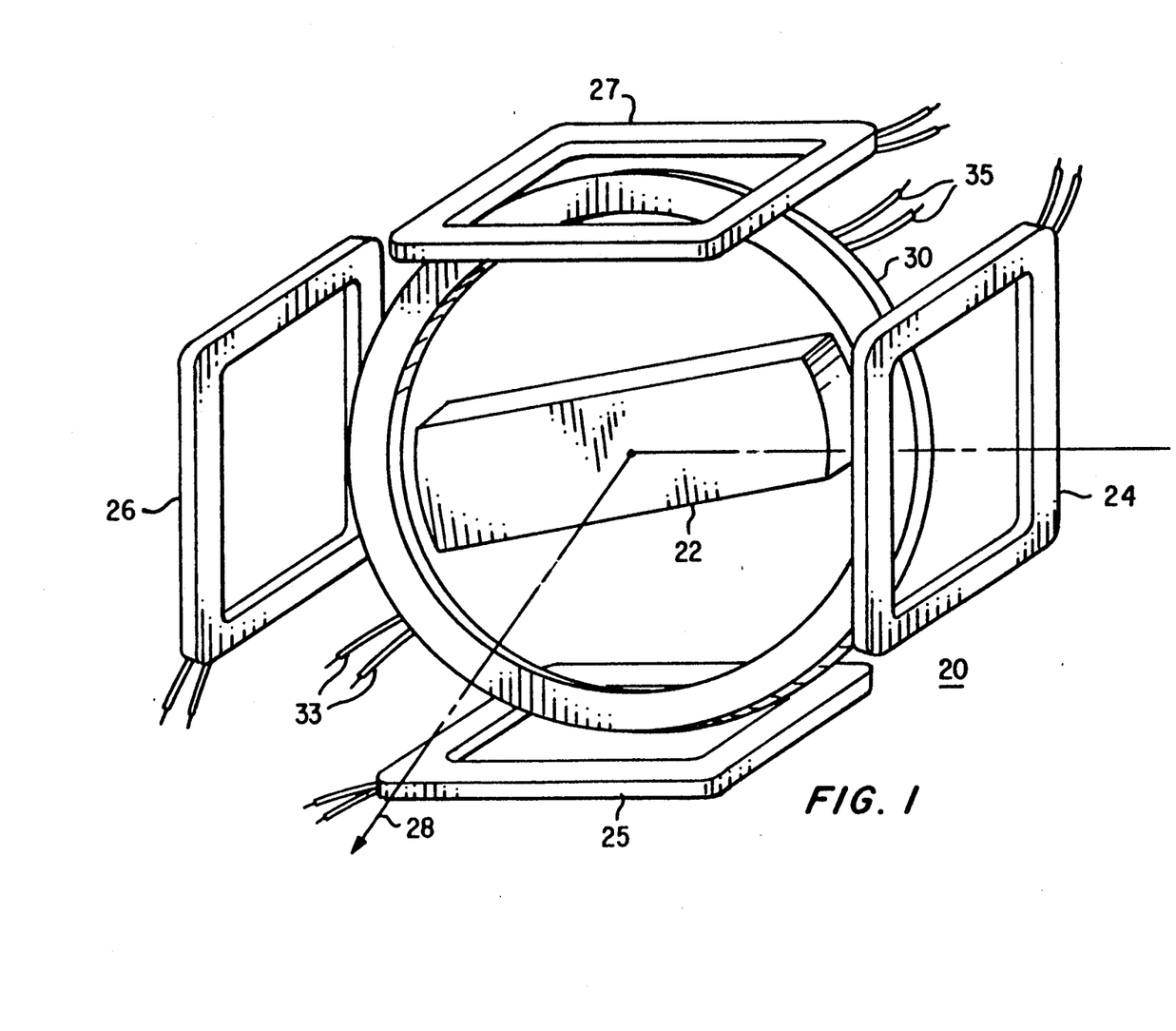
FIG. 1 is a view of a portion of a permanent magnet gyroscope motor including a single sensor and single torquer in accordance with the present invention.

Referring now to the drawing and FIG. 1 in particular, there is illustrated a two degree of freedom permanent magnet gyroscope drive motor 20. The permanent magnet drive motor 20 includes a permanent magnet rotor 22 and a two phase stator having four windings 24, 25, 26 and 27. Windings 25, 27 are for phase A, and windings 24 and 26 are for phase B. The permanent magnet rotor 22 drives the rotating portion of a gyroscope 10, as described above for FIG. 11, to spin around a reference or null spin axis 28. A circular member 30 is disposed around and in close proximity to rotor 22. Circular member 30 lies in a plane substantially orthogonal to the spin axis 28. Circular member 30 includes an embedded sensor coil, with leads 33, having a plurality of loops around spin axis 28 and also includes an embedded torquer coil, with leads 35, which is electrically insulated from the sensor coil and which also includes a plurality of loops extending around spin axis 28. When the actual spin axis or rotor 22 is displaced from the reference spin axis 28, a signal is induced in the sensor coil. The signal induced in the sensor coil is conditioned and amplified and fed to the torquer coil to urge the permanent magnet rotor 22 to a position wherein the reference axis 28 coincides with the actual rotor spin axis and the spinning rotor 22 and circular member 30 lie in a common plane orthogonal to spin axis 28.

Figure 2:
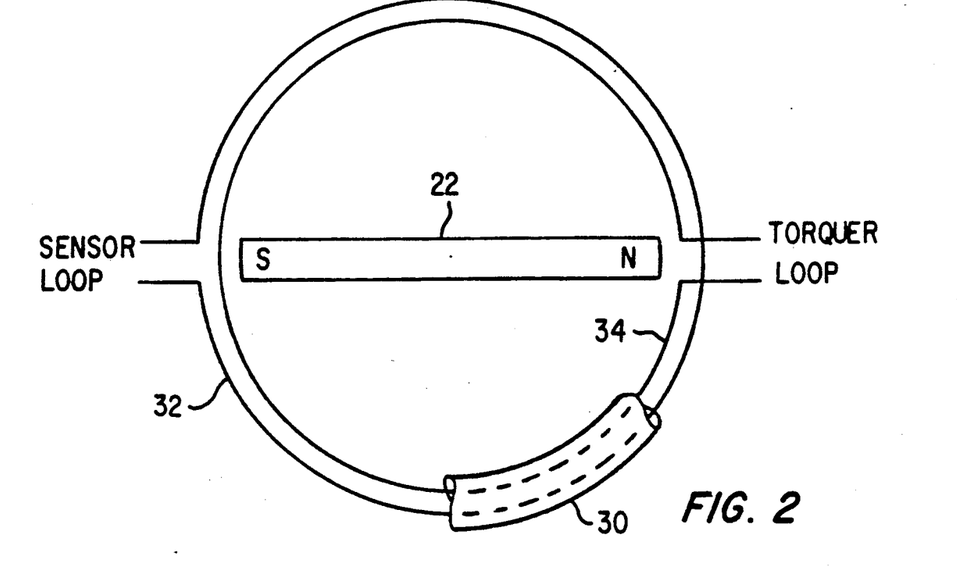
FIG. 2 is a schematic view of a permanent magnet rotor, with a sensor loop and torquer loop lying in a plane orthogonal to the spin axis, which is useful for describing the present invention.

Referring now to FIG. 2 there is shown a sensor coil 32 and a torquer coil 34 shown embedded in circular member 30. In FIG. 2 for simplicity a single loop is shown for the torquer coil 34 and a single loop is shown for the sensor coil 32 while in actual implementation the torquer coil 34 and the sensor coil 32 will both be constructed with multiple loops embedded in circular member 30 which extends around rotor 22.

Figure 3:
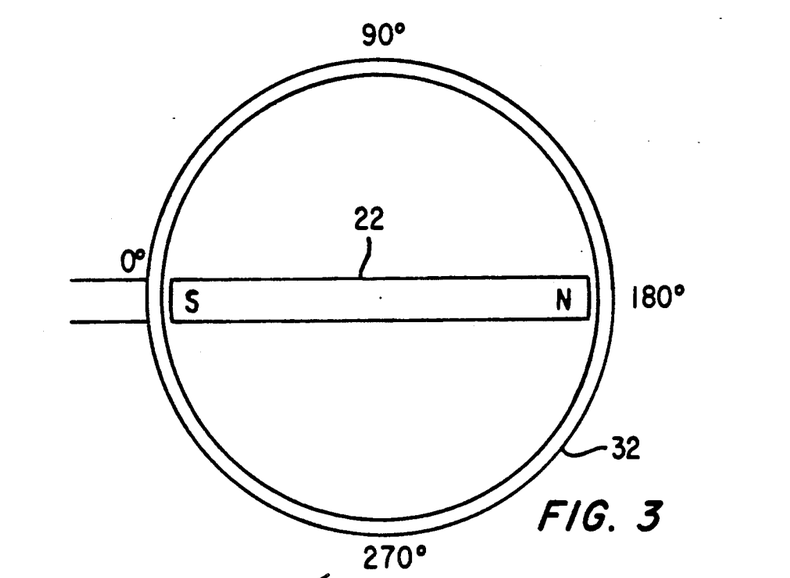
FIGS. 3, 3a, 3b, 3c and 3d show the position of the permanent magnet rotor with respect to the sensor loop and the voltages induced for various tilt angles.
Figure 3A:
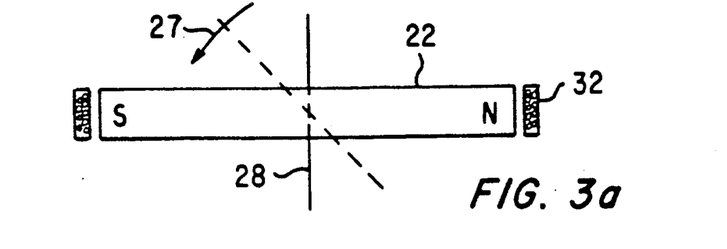
Figure 3B:
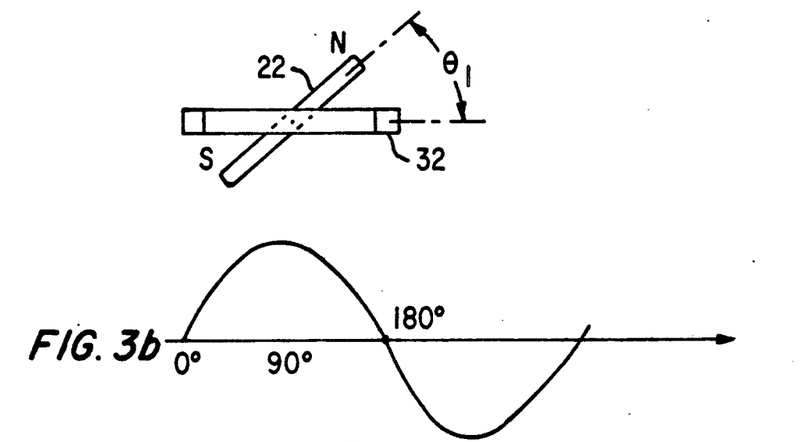
Figure 3C:
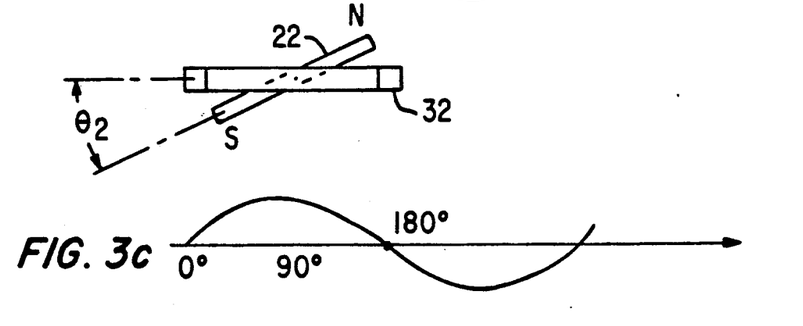
Figure 3D:
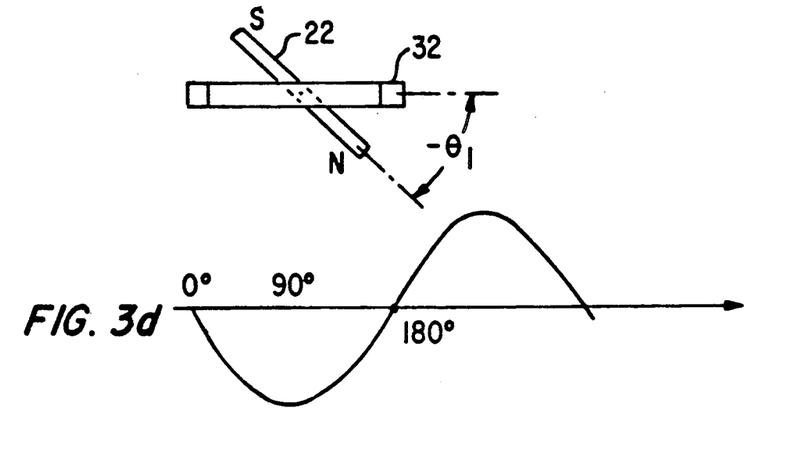

Referring now to FIGS. 3, 3a, 3b, 3c and 3d there is shown a sensor coil 32 and the signals induced in sensor coil 32 when there is a tilt of the actual spin axis with respect to the reference spin axis 28. FIG. 3 is a view of the permanent magnet rotor 22 in the same plane as sensor coil 32. FIG. 3a is a side view, partial in section, of FIG. 3. When the spinning permanent magnet rotor lies in the same plane as sensor coil 32 there will be no signal induced in the sensor coil 32 as rotor 22 spins. However, if the actual axis about which rotor 22 spins is displaced from the reference or null spin axis 28, as shown by arrow 27 in FIG. 3a, and by angle θ in FIGS. 3b, 3c and 3d, a signal is induced in sensor coil 32. The magnitude of the AC signal induced in sensor coil 32 is a function of the angular displacement of the actual rotor spin axis, about a polar coordinate axis, from the null spin axis 28. The phase of the AC signal is determined by the position of the arbitrary polar coordinate axis positioned with respect to sensor loop 32. If 0° is selected as the position of the loop 32, as shown in FIG. 3, and the actual spin axis of rotor 22 tilts toward the selected 0° position, as shown in FIG. 3a, the resulting sine waveform will be as shown with zero magnitude at 0° and 180° and peaks at 90° and 270°. The position on the coil 32 towards which the actual spin axis tilts will determine the zero crossing points and the phase of the induced AC sine wave signal. The position and degree of angular tilt of the actual spin axis will determine the polarity and magnitude of the AC signal; as shown in FIGS. 3, 3a, 3b, 3c and 3d.

Figure 4:
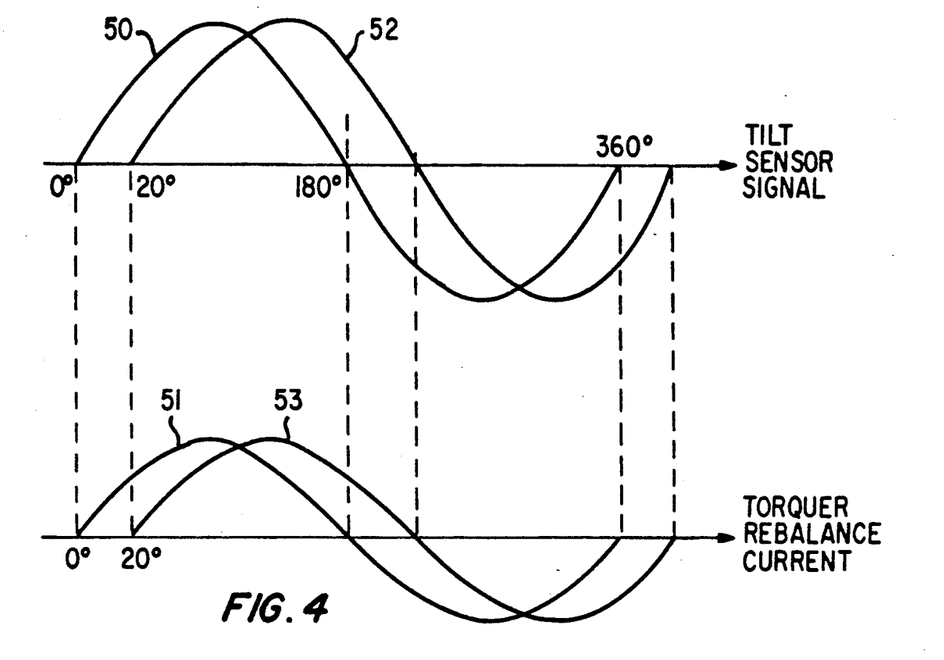
FIG. 4 are waveforms, for the angular sensor signal and the torquer rebalance current, showing the phase displacements when the actual spin axis is tilted about an axis which is at two different positions, 0° and 20°, with respect to the sensor coil.

Referring now to FIG. 4 there is shown the waveforms of the signal induced in sensor coil 32 for the actual spin axis of rotor 22 tilted towards a 0° position as compared with the actual spin axis tilted towards a 20° position. Note, for these waveforms the angle of tilt is the same. Waveform 50 for tilt towards the 0° position shows an AC waveform having zero crossings at 0° and 180°. Waveform 52 is induced for the actual spin axis tilted towards a 20° position and has an AC waveform with zero crossing points at 20° and 200°. The frequency of the AC waveforms is this frequency of spin and may be a common aircraft power supply frequency such as 400 Hz. Beneath the waveforms of the signals induced in the sensor coil 32 are waveforms showing torquer rebalance currents into polar torquer coil 34 to urge the rotor 22 to a null position.

When sensor coil 32 has induced therein an AC signal with a waveform 50 a torquer rebalance AC current with a waveform such as 51 is applied to the torquer coil 34. Likewise, when an AC signal with a waveform 52 is detected a torquer rebalance current with a waveform 53 is applied to the torquer coil 34 for moving rotor 22 to a null position. In FIG. 4 the torquer rebalance currents are shown as sinusoidal waveforms but in some embodiments square waves having the same phase relationship can be utilized to increase the rebalance force. Gyroscopic phasing is accounted for in the signal conditioning circuit 64.

Figure 10:
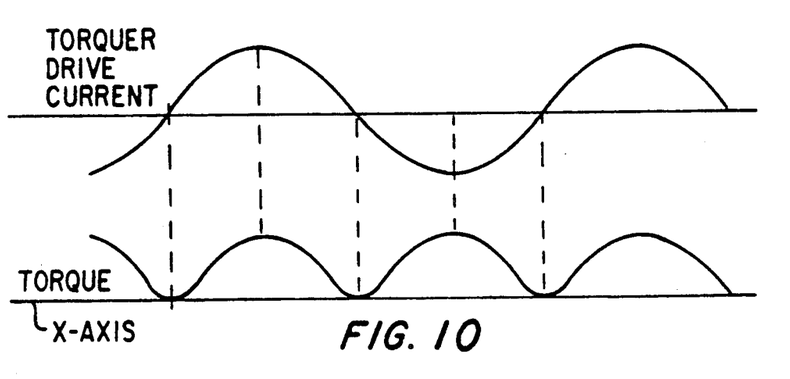
FIG. 10 is an illustration of the waveform of the torquer drive current and the torque applied on the permanent magnet rotor about its X axis; and, FIG. 11 is a section view of a miniature two degree of freedom gyroscope which can use the teachings of the present invention.

Referring now to FIGS. 7 through 10 there is shown a simplified representation of the torquer coil 34 and the torquer drive current which is applied thereto for moving rotor 22 to a null position. If the angular positions about loop 34 and the X, Y axes are selected for explanation as shown, the preferred torquer drive current will be as shown in FIG. 10. The torquer drive current waveform is in phase with the signal sensed by sensing coil 32. When the torquer drive current is applied to coil 34, which is formed with a plurality of loops, a positive torque will be applied to rotor 22 to precess rotor 22 about the X axis towards the null position lying in the same plane as coil 34. It is important in understanding this invention to recognize that for any displacement of the actual spin axis of rotor 22 from the null spin axis 28 the phase and magnitude of the signal induced in sensor 32 is used to provide a torquer drive current to torquer coil 34 of the proper phase and magnitude to urge rotor 22 to the null position wherein the actual spin axis is aligned with the null spin axis 28. This is accomplished with the single sensor coil 32 and the single torquer coil 34.

Figure 5:
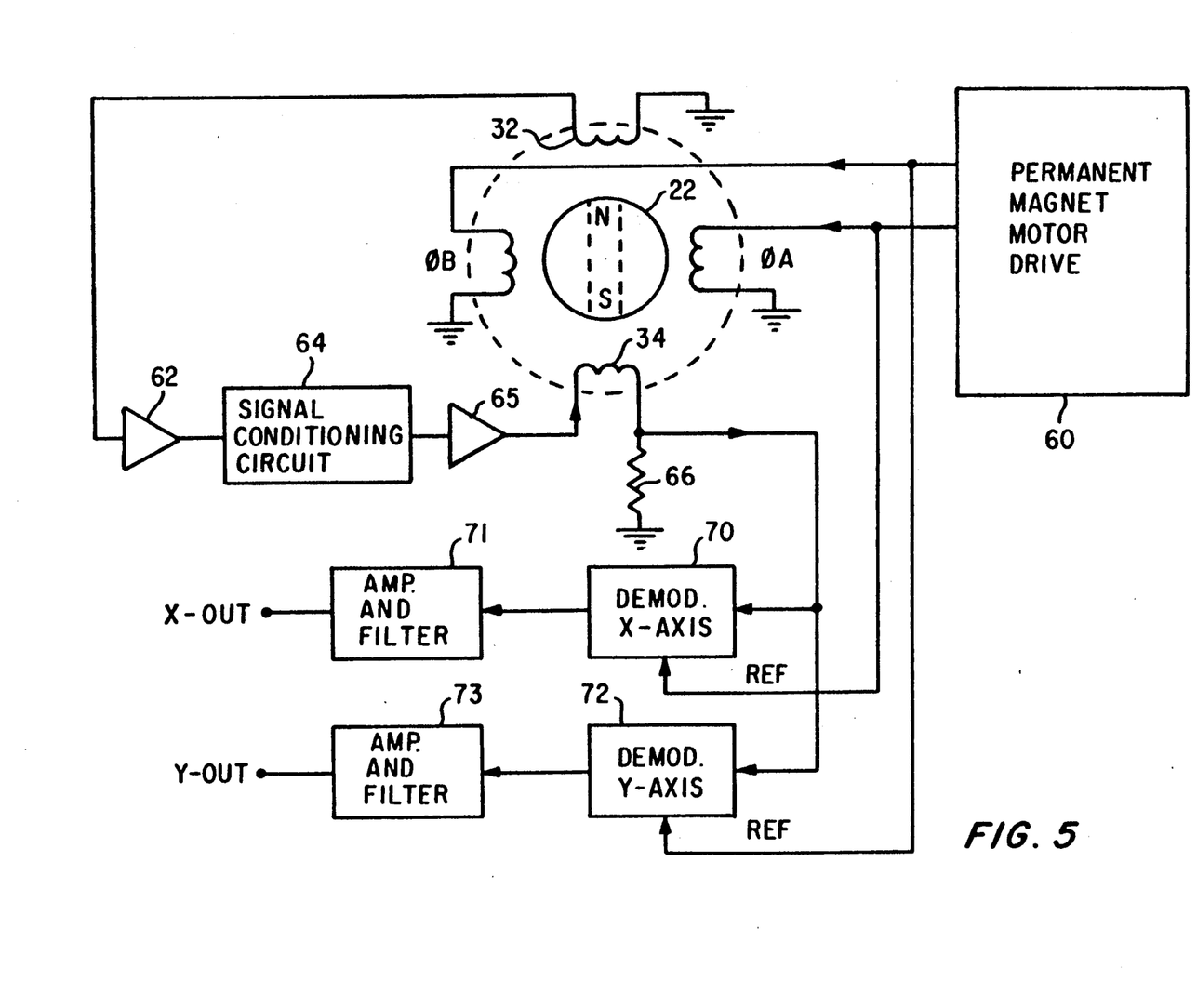
FIG. 5 is a block diagram showing the operation of a sensor and torquer rebalance system according to the present invention.

Referring now to FIG. 5 there shown a blocked diagram of a polar loop servo control for a two degree freedom gyro according to the present invention. The wheel drive for the two phase stator can be of the type which is well known in the art, and is described in U.S. Pat. No. 4,818,922. Wheel drive 60 provides drive current to phase A and phase B stator windings for rotating the permanent magnet rotor 22. The polar tilt sensor coil 32 and the polar torquer coil 34 are separate parallel windings electrically insulated from each other and embedded in the circular member 30 as shown in Figure 1. When the gyro is at a null position the permanent magnet rotor 22 rotates in the plane of circular structure 30 and no voltage is induced into the sensing coil 32. If the dynamics of the guidance system causes a tilt of the plane in which permanent magnet rotor 22 rotates a sinusoidal voltage as described previously will be induced into the tilt sensing coil 32 having a magnitude proportional to the tilt angle, a phase which is a function of the position of the actual spin axis with respect to a polar coordinate representation around composite coil 30 and a frequency which is a function of the angular spin frequency.

The signal induced in sensor 32 is propagated to a tilt sensor preamplifier 62. Amplifier 62 feeds the amplified signal to a signal conditioning circuit 64 which provides an output signal of the proper shape, phase and frequency for rebalancing the gyro. The output of the signal conditioning circuit 64 feeds a torquer driver 65 which power boosts the signal from circuit 64 to the proper magnitude for driving the torquer coil 34. The properly phase adjusted torquer current will interact with the rotating permanent magnet rotor 22 in a manner so as to generate a torque to restore the tilt plane of rotor 22 to coincide with the plane of the torquer coil 34 and the sensing coil 32, which is orthogonal to the null spin axis 28.

If a cartesian (X,Y) output for conventional guidances is desired, the torquer current is sensed across current sensing resistor 66. This signal is fed to an X axis demodulator 70 and a Y axis demodulator 72. A demodulator reference signal for the X axis demodulator 70 is obtained from the phase A stator drive and a demodulator reference signal for the Y axis demodulator 72 is obtained from the phase B stator drive signal. The X axis demodulator feeds a scaling amplifier and filter circuit 71 which has an output representative of an X axis rate. Y axis demodulator 72 feeds a scaling amplifier and filter circuit 73 which provides a Y axis output.

Figure 6:
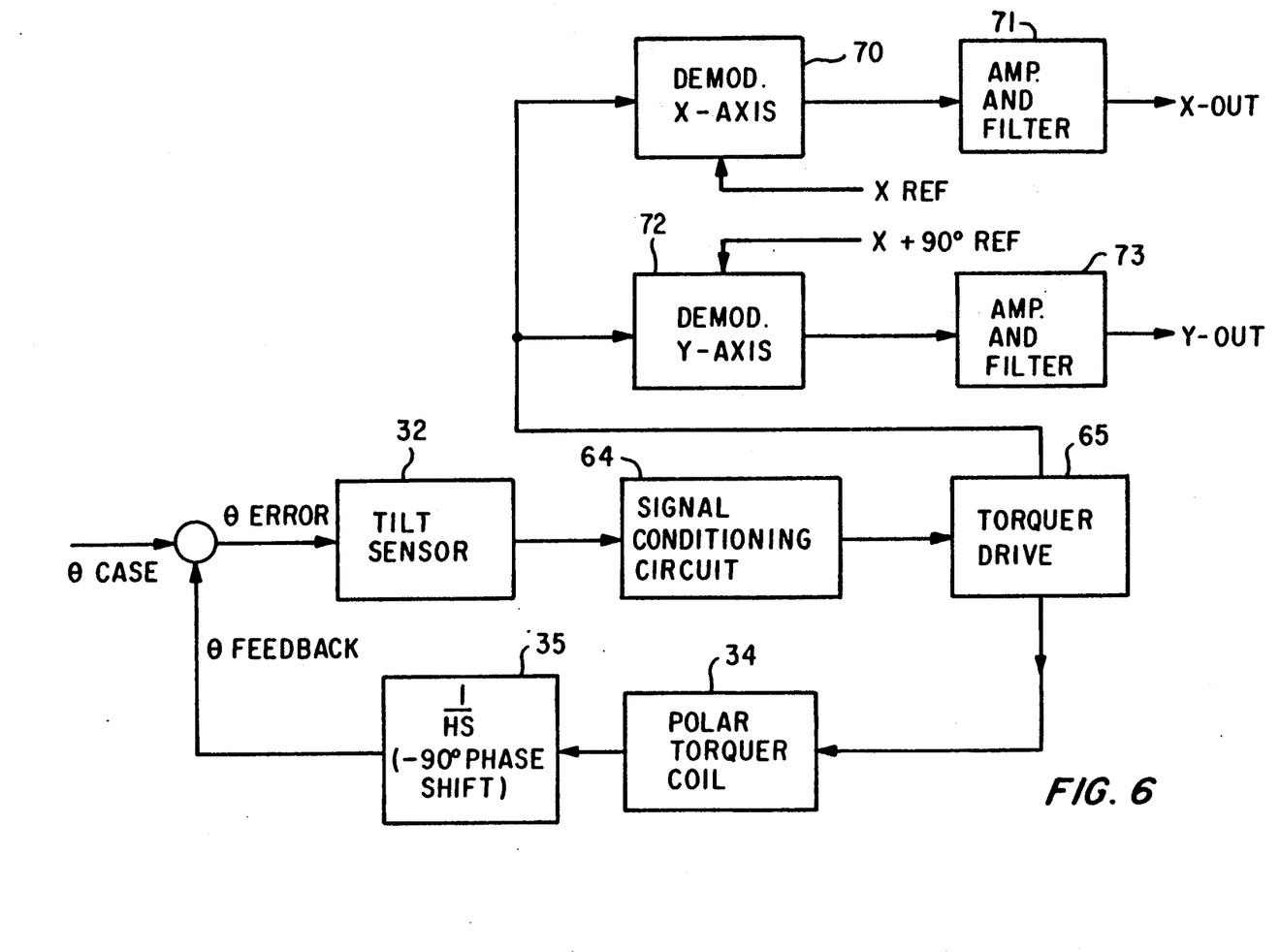
FIG. 6 is a block diagram representation showing the single servo control loop of the present invention.
Figure 7:
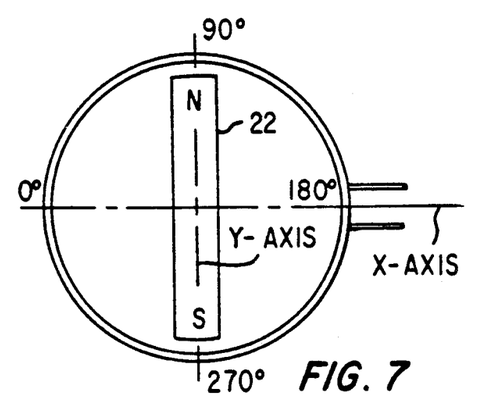
FIG. 7 is a simplified top view illustration of the torquer loop and permanent magnet rotor.
Figure 8:
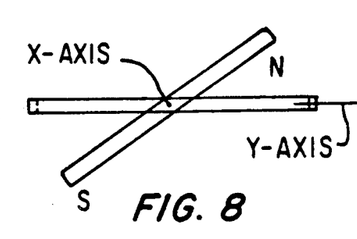
FIG. 8 is a right side view of FIG. 7.
Figure 9:
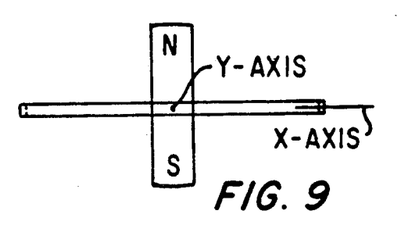
FIG. 9 is a bottom view of FIG. 7.

Referring now to FIG. 6 there is shown a control loop representation of the disclosed polar loop implementation for a two degree of freedom gyro. Note, only a single loop is required for urging the gyro to a null position. When the actual spin axis of the gyro tilts, a signal is sensed by tilt sensor 32, signal conditioned by signal conditioning circuit 64, amplified and filtered by torquer drive 65 and fed to torquer coil 34 to rebalance the gyro. In FIG. 6 $\theta$case refers to gyro case angular disturbance. $\theta$feedback refers to rotor tilt about the corresponding axis. $\theta$error is the resulting differential angle as measured by the sensing coil 32. The gyro kinematics, as indicated by block 35, provides the necessary 90° phase shift as implied by the La-Place operator in the transfer function 1/HS in block 35. Signal conditioning circuit 64 provides the necessary gain and phase for proper loop operation. Torquer driver 65 provides the current to drive the polar torquer 34. The generated torque acts upon the angular momentum of the gyro spinning member 22 causing it to precess to reduce $\theta$error to null. The blocks 70 through 73 for providing X-axis, Y-axis cartesian outputs are as described for FIG. 5.

What is claimed:

1. A two degree of freedom gyroscope having a motor with a permanent magnet rotor connected to rotate the rotatable portion of the gyroscope around a null spin axis comprising:
    motor drive means for driving the permanent magnet rotor;
    a sensing coil having at least one loop which lies in a plane orthogonal to the null spin axis and which is disposed in proximity to the permanent magnet rotor, wherein an AC signal is induced in said sensing coil, whose magnitude is a function of the tilt angle between the actual spin axis and the null spin axis whose phase is a function of the actual spin axis position with respect to the sensing coil and whose frequency is a function of the spin frequency;
    a torquer coil having at least one loop which lies in a plane orthogonal to the null spin axis and which is disposed in proximity to the permanent magnet rotor; and
    torque drives means responsive to the AC signal induced in said sensing coil when the actual spin axis of the permanent magnet rotor is displaced from the null spin axis for providing a drive current to said torquer coil to urge the permanent magnet rotor to a position wherein the actual spin axis coincides with the null spin axis.

2. A gyroscope as claimed in claim 1, wherein said sensing coil and said torquer coil are electrically insulated and each comprises multiple loops and both are formed in a unitary one piece structure.

3. A gyroscope as claimed in claim 1, comprising demodulating means for demodulating the AC torquer current into X axis and Y axis signal components indicative of the actual spin axis rate in a cartesian coordinate format.

4. A gyroscope utilizing a permanent magnet motor comprising:
    rotor drive means for synchronously spinning the rotor at a selected spin frequency about a spin axis which coincides with the null axis of the rotor when the rotor is in a null position;
    a sensing coil having windings which lie in a plane perpendicular to the null axis and having windings which loop around the null axis and which has induced therein an AC signal whose magnitude is a function of the tilt angle between the actual spin axis and the null spin axis, whose phase is a function of the actual spin axis position with respect to the sensing coil, and whose frequency is a function of the spin frequency;
    a torquer coil having windings which lie in a plane perpendicular to the null axis and which loop around the null axis; and
    torquer drive means receiving the AC signal from said sensing coil when said actual spin axis and said null spin axis do not coincide and in response thereto providing a drive signal to said torquer coil to drive the actual spin axis of the rotor to the null axis.

5. A method of controlling a drive motor having a permanent magnet rotor in a two degree of freedom gyro to urge the actual gyro spin axis to coincide with a null spin axis comprising the steps of:
    providing a permanent magnet motor drive for directly driving the permanent magnet rotor to spin at a selected spin frequency,
    disposing a sensor coil having loops around the null axis and the permanent magnet rotor in a plane orthogonal to the null axis which has induced therein an AC signal with a frequency the same as the spin frequency and whose phase is a function of the actual spin axis position with respect to the coil;
    disposing a torquer coil having loops around the null axis and the permanent magnet rotor in a plane orthogonal to the null axis;
    sensing the AC signal induced in the sensor coil when the actual spin axis of the gyro does not coincide with the null spin axis; and,
    providing a feedback loop which utilizes the AC signal from the sensor coil through appropriate electronic circuitry to provide drive current to the torquer coil to urge the rotor to a null position wherein the spin axis and the null axis coincide.

6. A gyroscope utilizing a permanent magnet motor comprising:
    rotor drive means for spinning a rotor at a spin frequency about a spin axis which coincides with the null axis of a rotor when the rotor is in a null position;

sensing means for sensing an AC signal with a frequency which is the same as the spin frequency and which indicates the position and the degree by which an actual spin axis deviates from the null spin axis;

a torquer coil having windings which lie in a plane perpendicular to the null axis and which loop around the null axis; and, torquer drive means responsive to said sensing means for providing AC current, with a frequency the same as the spin frequency, to said torquer coil to urge the actual spin axis to the null spin axis position.

7. A gyroscope as claimed in claim 6 wherein the magnitude of the AC current is a function of the angular tilt of the actual spin axis and the phase of the AC current is a function of the position of the tilt with respect to said sensing means.

* * * * *